US006998576B2

(12) United States Patent  (10) Patent No.: US 6,998,576 B2
Marquis  (45) Date of Patent: Feb. 14, 2006

(54) ELECTRICALLY HEATED HAND GRIP

(76) Inventor: Vaughn Joseph Marquis, 185 7th Ave., Madawaska, ME (US) 04756

( * ) Notice: Subject to any disclaimer, the term of this patent is extended or adjusted under 35 U.S.C. 154(b) by 59 days.

(21) Appl. No.: 10/714,224

(22) Filed: Nov. 14, 2003

(65) Prior Publication Data

US 2005/0103769 A1   May 19, 2005

(51) Int. Cl.
*B60L 1/02* (2006.01)
(52) U.S. Cl. .................... 219/204; 219/538; 219/541
(58) Field of Classification Search ................ 219/204, 219/201, 528, 529, 535, 549, 207, 221, 538, 219/541, 521, 525, 240, 246; 124/86, 88; 43/23–25; 242/157 R
See application file for complete search history.

(56) References Cited

U.S. PATENT DOCUMENTS

| 744,739 A | 11/1903 | Pliess |
| 3,164,921 A | 1/1965 | Mavrakis |
| 4,598,192 A | 7/1986 | Garrett |
| 4,937,429 A | 6/1990 | Hollander |
| 5,341,927 A | 8/1994 | Coyner |
| 5,517,786 A * | 5/1996 | Peissig ................... 43/18.1 R |
| 5,613,407 A | 3/1997 | Ogata |
| 5,626,780 A | 5/1997 | Ogata |
| 5,735,037 A | 4/1998 | Ogata |
| 5,834,734 A | 11/1998 | Ogata |
| 5,870,815 A * | 2/1999 | Karner et al. ............. 29/407.1 |
| 2003/0218007 A1 * | 11/2003 | Cornell ...................... 219/541 |

* cited by examiner

*Primary Examiner*—Robin O. Evans
*Assistant Examiner*—Vinod Patel
(74) *Attorney, Agent, or Firm*—Vaughn J. Marquis; Stephen J. Weyer

(57) ABSTRACT

The electrically heated hand grip includes a hand grip, a heating member disposed within the hand grip, an end cap assembly removably attached to the hand grip, and an electrical switch coupled to a power source for controlling the supply of current to the heating member. The end cap assembly includes a receptacle for receiving the power source and an electrical connecting means. The end cap assembly may include a light-emitting diode and a charging means. In an alternative embodiment, the electrically heated hand grip includes a resilient strip having a heating member attached to an interior surface of the resilient strip to form a heating strip. The heating strip is spirally wrapped about a grip-receiving portion of a shaft. An end cap assembly is coupled to the end of a shaft to secure a portion of the heating strip. The heated hand grip can include a sleeve which is inserted on the end of a shaft and the heating strip is spirally wrapped about the sleeve.

32 Claims, 8 Drawing Sheets

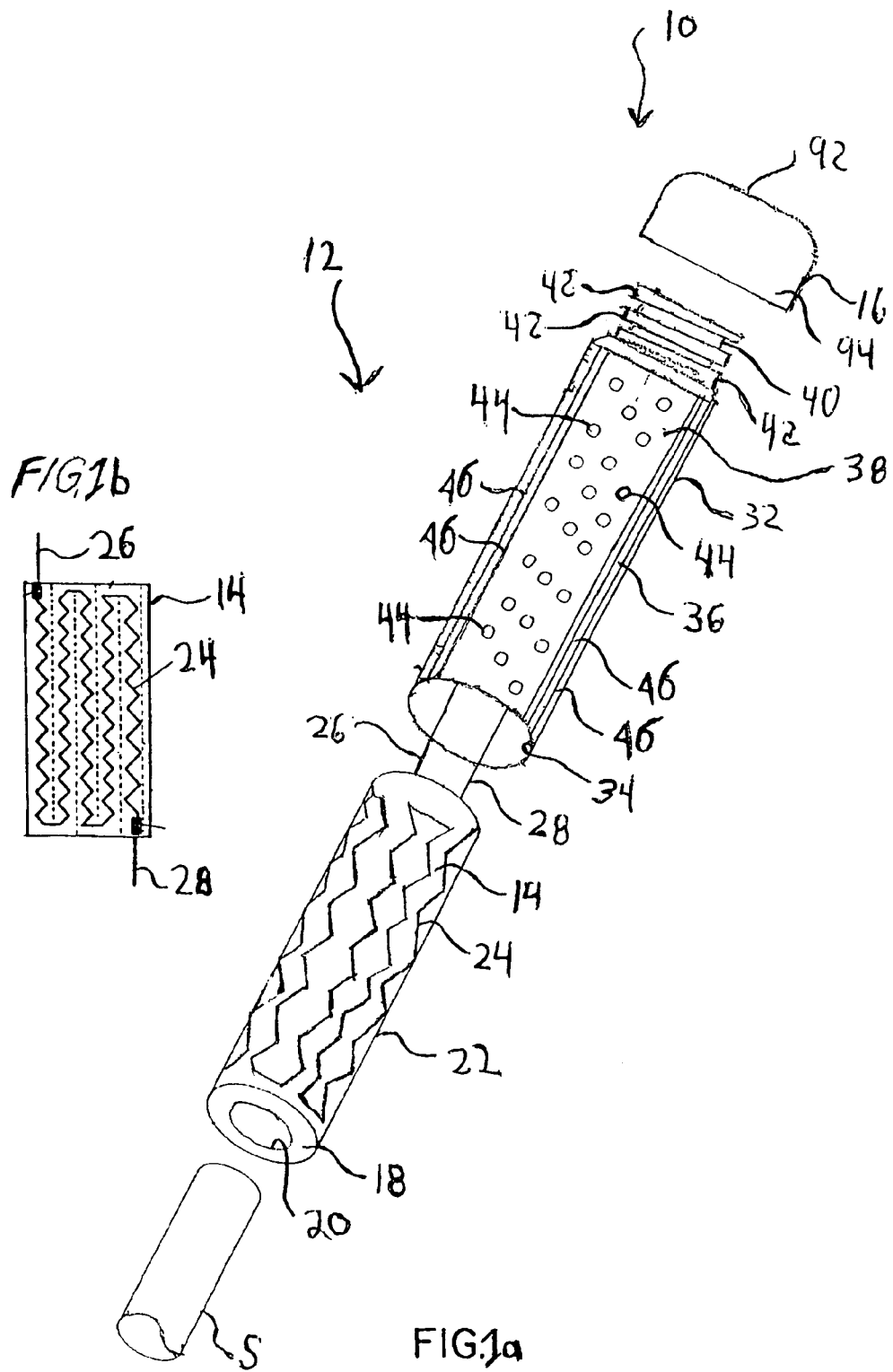

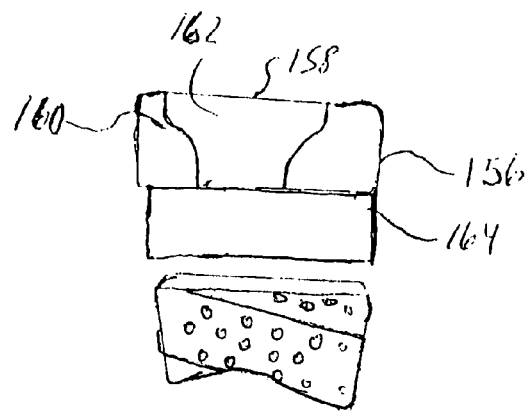
FIG. 11
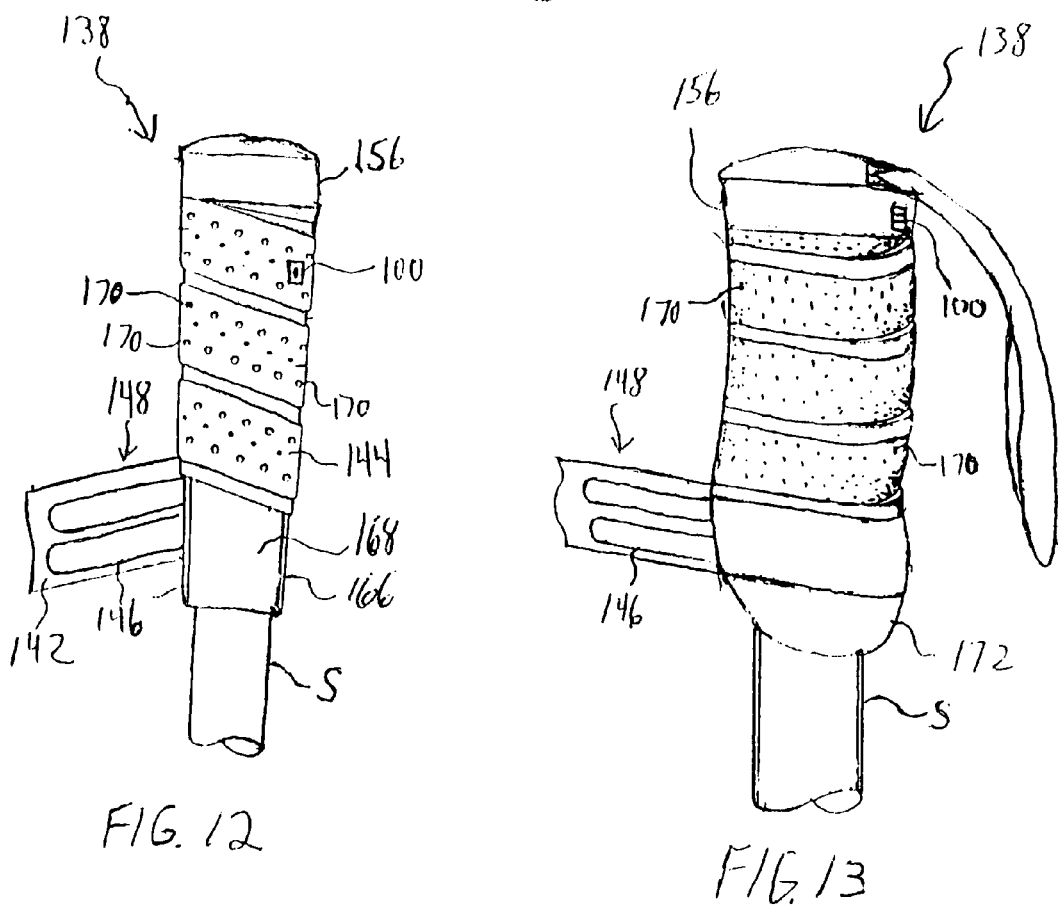
FIG. 12
FIG. 13

ELECTRICALLY HEATED HAND GRIP

FIELD OF THE INVENTION

The present invention relates to hand grips and, more particularly to an electrically heated hand grip for sporting equipment, tools and the like.

BACKGROUND OF THE INVENTION

Most hand grips used on sporting equipment and tools are designed to provide a cushion for shock absorbing or insulating qualities. In one example, conventional hand grips for golf clubs generally include integral grips and wrapped strip grips. The integral grip includes one or more pieces that are molded from a rubber or plastic material and joined together to form a complete one-piece hand grip, which is easily mounted or inserted, on to the end of a shaft. The wrapped strip grip may include an inner sleeve which is inserted on to the end of a shaft and a resilient strip which is spirally wrapped and secured around the exterior surface of the inner sleeve. The resilient strip is generally made of leather, rubber, foam or a plastic material.

An existing problem with conventional hand grips is that they do not provide heat to a user's hands. In the golfing arena, both professional and amateur golfers alike spend countless hours on the golf course perfecting their skills. The golfer is often exposed to the elements of rain, wind and cold temperatures, which can have an unpleasant effect on the joints, fingers, and hands of the golfer. The joints and fingers become stiff and painful, thus, making it difficult for the person to securely grip the golf club. The elements can also impact the physical properties of the golf club itself such that the hand grip of the golf club becomes hard and inflexible thereby reducing the shock absorbing and slip-inhibiting qualities of the hand grip and further degrading the player's performance. Therefore, there exists a need for an electrically heated hand grip for the shaft of an apparatus, such as a golf club, in order to warm the hands of a user.

Conventionally, electrically heated hand grips have been utilized on handlebars of vehicles. Examples of such vehicles include snow mobiles, bicycles, snow blowers, and motorcycles. One prior art electrically heated hand grip is disclosed in U.S. Pat. No. 4,937,429 to Hollander. The Hollander patent discloses an electrically heated hand grip having an internal sleeve including helical grooves and lands formed on the outer surface of the sleeve and an anchor means. The heated hand grip further includes electrical resistance heating wire which is disposed about the anchor means and inserted within the helical grooves such that the heating wire is helically wound around the outer surface of the internal sleeve. An external protective jacket is molded over the. internal sleeve and resistance heating wire so as to bond and lock the heating wire securely into position thereby providing an integral hand grip. The heating wire is electrically connected to an external power source for generating heat.

Other areas in which electrically heated hand grips have been used include fishing rods. One prior art example is a heated handle for a fishing rod as disclosed in U.S. Pat. No. 4,598,192 to Garrett. The Garrett patent discloses an electrically heated handle comprising a thermally conductive shell which encloses an interior chamber. An elongated, electric heating coil extends longitudinally through the interior chamber and is electrically connected to an external power source, through an on-off switch, for controllably supplying electrical current to the heating coil for generating heat. The heat generated from the heating coil is dissipated within the interior chamber and transmitted to the thermally conductive shell thereby heating the handle of the fishing rod.

One prior art which heats hand grips of golf clubs is disclosed in U.S. Pat. No. 5,341,927 to Coyner. The Coyner patent discloses a golf bag including electrical heating elements which are formed into a plurality of cylindrical receptacles and disposed within the golf bag. Individual golf club shafts are inserted into corresponding cylindrical receptacles so as to surround the grips of the golf clubs and heat the grips as the golf clubs sit in the golf bag. Other examples of heating the hand grips of golf clubs include, U.S. Pat. No. 5,834,738 to Wilson, "Heated Golf Bag Apparatus", U.S. Pat. No. 3,707,279 to Kalser, "Golf Club and Ball Warmer", and U.S. Printed Publication No. 20030170013 to Patshkowski et al., "Golf Club Grip Heating Apparatus and Method of Heating Golf Club Grips".

SUMMARY OF THE INVENTION

Accordingly it is an objective of the present invention to provide a an electrically heated hand grip for heating the hands of a person when the person is securely gripping the shaft of an apparatus, such as a golf club.

It is also a further objective of the present invention to provide an electrically heated hand grip which comprises a completely, integrated hand grip or a wrapped strip grip which can be easily mounted on to the end of a shaft.

In accordance with the present invention, there is provided an electrically heated hand grip comprising a hand grip adapted to be mounted on an end of a shaft; a heating member affixed within said hand grip; an end cap assembly including a receptacle for receiving an electrical connecting means and a power source, said end cap assembly being removably attached to said hand grip; and an electrical switch being electrically coupled to said power source, said electrical connecting means and said heating member for controlling the supply of current to said heating member.

Preferably the hand grip further comprises an inner sleeve having an interior surface and an exterior surface, said inner sleeve adapted to be mounted on the end of said shaft and an outer sleeve including a gripping section and an end section, said outer sleeve being inserted over said heating member and said inner sleeve so as to receive said first electrical terminal and said second electrical terminal such that said terminals pass longitudinally through said outer sleeve and extend outward from said end section.

Advantageously, the heating member includes a first electrical terminal and a second electrical terminal, said heating member being surroundingly attached to the exterior surface of said inner sleeve.

Preferably, the outer sleeve is adhesively bonded to said heating member and said inner sleeve such that the outer sleeve completely encapsulates the heating member and the exterior surface of said inner sleeve forming an integral grip.

Preferably, the heating member comprises any one of electrical heating resistance wire, etched-foil heater, a flexible printed circuit heater and a flexible carbon fiber heater.

Advantageously, the end section includes a plurality of threads externally formed thereon and the end cap assembly further includes a top member, a sidewall member coupled to said top member so as to form said receptacle, and a plurality of threads internally formed within said sidewall member for threadably receiving said end section.

Advantageously, the electrical connecting means includes a first polarity contact, a second polarity contact and at least one connecting member.

Preferably, the electrical switch comprises any one of a variable resistance on-off switch, a timer switch, an on-off timer circuit, a thermostat switch, a potentiometer, a toggle switch, a dip switch, a pushbutton and a slideable switch, said electrical switch being disposed about any one of said top member, said sidewall member, and said outer sleeve.

Advantageously, the end cap assembly further includes a light-emitting diode electrically coupled to said electrical switch, and said power source for indicating when said heating member is activated and a charging means electrically coupled to said power source for charging said power source.

Preferably, the shaft comprises a shaft of any one of a golf club, tennis racket, badminton racket, hockey stick, ski pole, curling broom, paddle, fishing rod, broom, shovel, rake, hoe, screw driver, hammer, gardening tools, umbrella, cane, and walking stick.

Advantageously, the gripping section includes a plurality of dimples or ridges.

In accordance with a further aspect of the invention, the hand grip further comprises an inner sleeve including an interior surface, an exterior surface, and a plurality of hollow ribs helically disposed about said exterior surface, said inner sleeve adapted to be inserted on to the end of said shaft.

Preferably, the hand grip further comprises an outer sleeve including a gripping section, an end section, and a plurality of spaced channels helically formed within an interior surface of said outer sleeve such that the plurality of spaced channels are positioned in corresponding relation to said plurality of hollow ribs.

Advantageously, the outer sleeve is inserted over said heating member and said inner sleeve so as to receive said first electrical terminal and said second electrical terminal such that said terminals pass longitudinally through said outer sleeve and extend outward from said end section, said outer sleeve being adhesively bonded to said inner sleeve such that said plurality of spaced channels are in bonding relation with said plurality of hollow ribs.

In a further embodiment, the hand grip further comprises an inner sleeve including an interior surface, an exterior surface, and a plurality of hollow stubs disposed about said exterior surface, said inner sleeve adapted to be inserted on the end of said shaft.

Preferably, the heating member includes a first electrical terminal and a second electrical terminal, said heating member passing through each of said plurality of hollow stubs so as to be longitudinally disposed about the exterior surface of said inner sleeve.

Preferably, the hand grip further comprises an outer sleeve including a gripping section, an end section, and a plurality of channels longitudinally formed within an interior surface of said outer sleeve such that the channels are positioned in corresponding relation to said plurality of hollow stubs.

Advantageously, the outer sleeve is inserted over said heating member and said inner sleeve so as to receive said first electrical terminal and said second electrical terminal such that said terminals pass longitudinally through said outer sleeve and extend outward from said end section, said outer sleeve being adhesively bonded to said inner sleeve such that said plurality of channels are in bonding relation with said plurality of hollow stubs.

In accordance with another aspect of the invention, there is provided an electrically heated hand grip adapted to be mounted on to a grip receiving portion of said shaft, said electrically heated hand grip comprising: a hollow inner sleeve having an interior surface and an exterior surface, said hollow sleeve being inserted on to said shaft of said golf club; a heating member including a first electrical terminal and a second electrical terminal, said heating member being molded within or adhesively attached or bonded to the exterior surface of said hollow inner sleeve; an outer sleeve including a gripping section and a threaded end section, said outer sleeve being inserted over said heating member and said inner sleeve so as to receive said first electrical terminal and said second electrical terminal such that said terminals pass longitudinally through said outer sleeve so as to extend outward from the end section, wherein said outer sleeve is adhesively secured to said hollow inner sleeve; an end cap assembly including a receptacle having an electrical connecting means and power source disposed therein, said end cap assembly threadably receiving said end section; and an electrical switch disposed about either said end cap assembly or said outer sleeve, said electrical switch being electrically coupled to said heating member and said power source for controlling the supply of current to said heating member.

In a further embodiment, there is provided an electrically heated hand grip comprising a resilient strip including an inner surface and an outer surface; a heating member molded within or adhesively attached to the inner surface of said resilient strip so as to form a heating strip, said heating strip being spirally wrapped about a shaft; and an end cap assembly removably coupled to said shaft and securing a portion of said heating strip.

Preferably, the heating member comprises any one of electrical heating resistance wire, etched-foil heater, a flexible printed circuit heater and a flexible carbon fiber heater.

Advantageously, the end cap assembly includes a top member and a sidewall member coupled to said top member so as to form a receptacle, said receptacle having a power source and electrical connecting means disposed therein.

Advantageously, the electrically heated hand grip further includes an electrical switch disposed about either said end cap assembly or the outer surface of said resilient strip, said electrical switch being electrically coupled to said power source for controllably supplying current to said heating member.

Preferably, the electrical switch includes any one of a variable resistance on-off switch, an on-off switch, an on-off timer or pulsing circuit, a timer, a thermostat switch, a potentiometer, a toggle switch, a dip switch, a pushbutton and a slideable switch.

Advantageously, the end cap assembly further includes a light-emitting diode electrically coupled to said electrical switch and said power source for indicating when said heating member is being activated and a charging means electrically coupled to said power source for charging said power source.

Preferably, the shaft comprises a shaft of any one of a golf club, tennis racket, badminton racket, hockey stick, curling broom, ski pole, paddle, fishing rod, broom, shovel, rake, hoe, screw driver, hammer, gardening tools, umbrella, cane, and a walking stick.

Advantageously, the electrically heated hand grip further comprises a sleeve having an interior surface and an exterior surface, said sleeve including heat reflective properties.

Preferably, the heating strip is spirally wrapped around the exterior surface of said sleeve such that a lower portion of said heating strip is secured to said sleeve and said shaft with an adhesive material or mechanical fastener.

Preferably, the heating member comprises any one of electrical heating resistance wire, etched-foil heater, a flexible printed circuit heater and a carbon fiber heater.

BRIEF DESCRIPTION OF THE DRAWINGS

FIG. 1a is an exploded view, taken in perspective of the electrically heated hand grip adapted to be mounted on the end of a shaft in accordance with a preferred embodiment of the present invention.

FIG. 1b is a front elevation view showing a heating member including a first electrical terminal and a second electrical terminal, as illustrated in FIG. 1a in accordance with the preferred embodiment of the present invention.

FIG. 11 is a partially sectioned front view illustrating an end cap assembly including a butt end, and a receptacle, where the end cap assembly is removably attached to the end of a shaft to secure a portion of the resilient strip.

FIG. 12 is a broken front elevation view of an electrically heated hand grip including a sleeve mounted on to a shaft of a golf club, a resilient strip having a heating member attached to the interior surface of the resilient strip so as to form a heating strip, said heating strip being spirally wrapped around the exterior surface of an inner sleeve, an end cap assembly being removably attached to an end section of the sleeve and the shaft, and an electrical switch disposed about the outer surface of th resilient strip or heating trip.

FIG. 13 is a top elevation view of an electrically heated hand grip including an sleeve mounted on to a shaft of a ski pole, a resilient strip having a heating member attached to the interior surface of the resilient strip so as to form a heating strip, said heating strip being spirally wrapped around the exterior surface of the sleeve and an end cap assembly including an electrical switch, said end cap assembly being removably attached to the end of the shaft and an end section of the sleeve.

DETAILED DESCRIPTION OF THE PREFERRED EMBODIMENTS

Figures 2A, 2B:
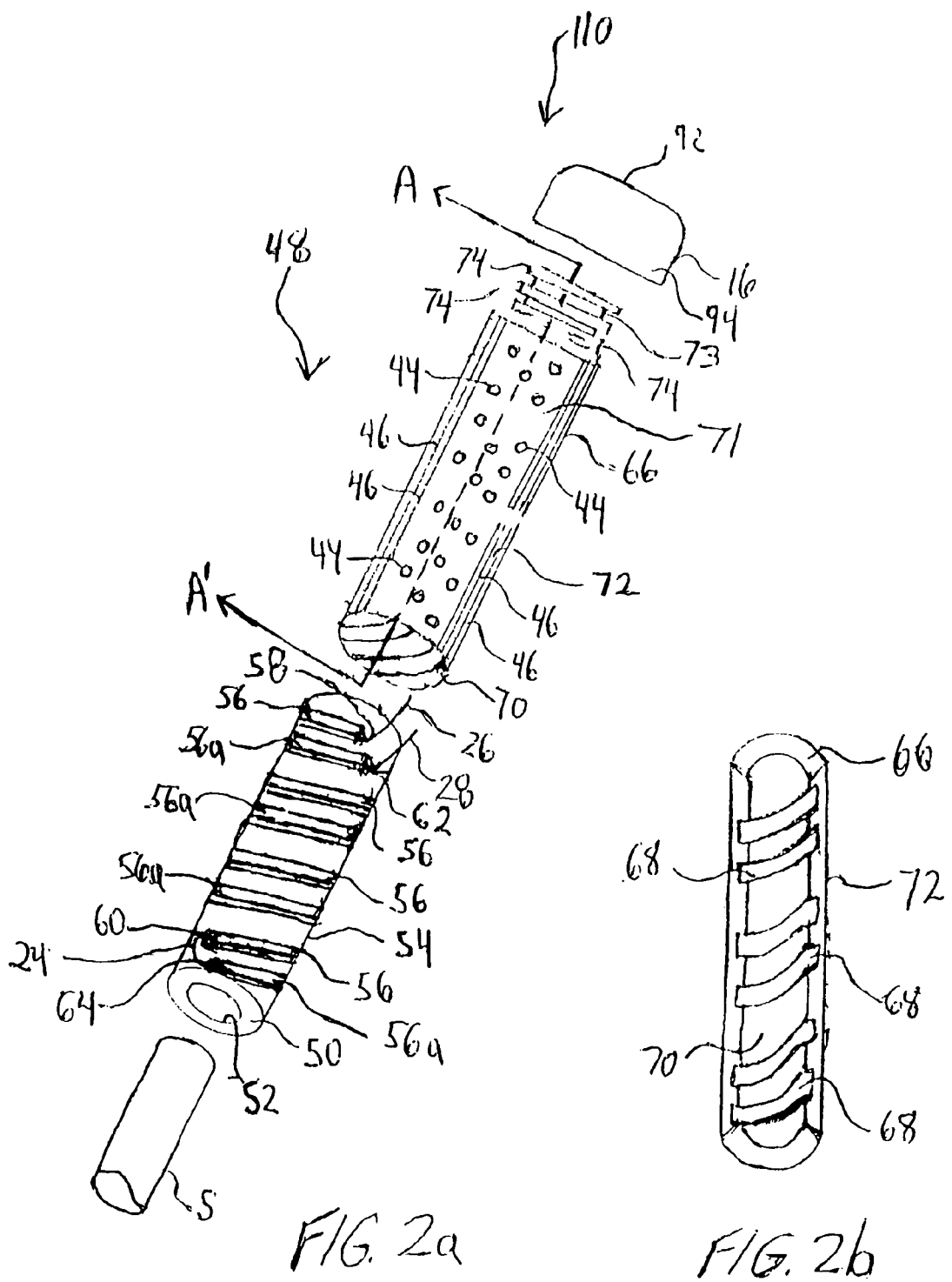
FIG. 2a is an exploded view, taken in perspective of the electrically heated hand grip adapted to be mounted on the end of a shaft. The electrically heated hand grip includes a hand grip which includes an inner sleeve having a plurality of hollow ribs for receiving electrical heating resistance wire, where the plurality of hollow ribs are helically wound around the exterior surface of the inner sleeve in accordance with a second embodiment of the present invention.
FIG. 2b is a cross sectional view of an outer sleeve taken along the line A–A' of FIG. 2a showing a plurality of spaced channels helically formed within the interior surface of the outer sleeve for receiving and correspondingly mating with the plurality of hollow ribs.

Referring to the Figures, the electrically heated hand grip is illustrated as being mounted on to the end of a generic shaft S. Notwithstanding the forgoing detailed description and the drawings provided herein which makes reference to the electrically heated hand grip being mounted on to the end of a shaft of a golf club, it will become apparent to one of ordinary skill in the art that the reference to the golf club is for description and readability only and is not to be inferred as limiting upon the present invention. The present invention is applicable to a variety of other devices or apparatuses and, more particularly, to sporting equipment, such as, but not limited to, a tennis racket, badminton racket, hockey stick, curling broom, paddles, ski poles, fishing rod, and to a variety of hand tools, such as, but not limited to, a broom, shovel, rake, hoe, screw driver, hammer, pruning shears, umbrella, cane, and walking stick.

Referring now to FIGS. 1a and 1b, there is shown an electrically heated hand grip, generally denoted at 10. The electrically heated hand grip 10 comprises a hand grip 12, a heating member 14 and an end cap assembly 16. The hand grip 12 includes a hollow, elongated, inner sleeve 18 having an interior surface 20 and an exterior surface 22. The inner sleeve 18 is adapted to be mounted or inserted over the end of a shaft S. The interior surface 20 of the inner sleeve 18 may be coated with a resin such that when the inner sleeve 18 is inserted on to the end of shaft S, the resin dissolves into a glue which secures the inner sleeve 18 to the shaft S. Other adhesive materials may be used to secure the inner sleeve 18 to the shaft S, such as, an epoxy material, hot-melt adhesive, adhesive tape, glue or contact cement. The inner sleeve 18 may be molded from a suitable synthetic plastic or rubber material, such as a polypropylene or polyolefin material having insulating and thermal properties so as to withstand high temperatures and restrict the conduction of heat. In a preferred embodiment, the inner sleeve 18 is cylindrical in shape having a preselected inner diameter so as to affect a firm grip when inserted on to the end of a shaft S. The length of the inner sleeve 18 should be long enough to cover a grip-receiving portion of the shaft S in order to provide sufficient gripping space for the hands of a user. Although the preferred embodiment comprises an inner sleeve 18 which is cylindrical in shape, the inner sleeve 18 may formed or fabricated in a variety of geometrical shapes which correspond to the shape of the shaft S.

Figure 7:
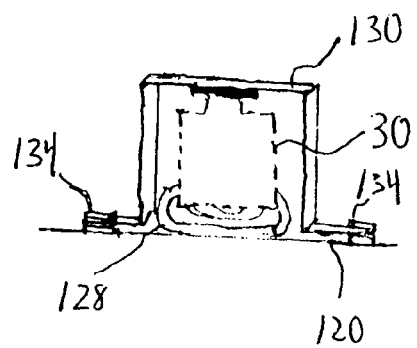
FIG. 7 is a side view of the electrical connecting means showing a first polarity contact, a second polarity contact, a power source, and holding posts.

As noted above, the electrically heated hand grip 10 further comprises a heating member 14 as illustrated in FIGS. 1a and 1b. The heating member 14 comprises any one of an electrical resistance heating wire, an etched-foil heater, a flexible printed circuit heater, and a flexible carbon fiber heater for generating heat, all of which are well known in the art and do not require further explanation herein. Preferably the heating member 14 is encapsulated in a thin sheet of flexible insulating material, such as a silicone rubber. The heating member 14 is adhered to the exterior surface 22 of the inner sleeve 18 so as to completely surround the exterior surface 22. The heating member 14 is attached to the exterior surface 22 of the inner sleeve 18 by an adhesive material, such as, an insulative epoxy, hot melt adhesive, glue, resin or adhesive tape. The heating member 14 further includes a first electrical terminal 26 and a second electrical terminal 28 for electrically connecting the heating member 14 to a power source 30 as shown in FIG. 7. The electrical terminals 26 28 extend outward from an upper end of the inner sleeve 18 as illustrated in FIG. 1a.

The heating member 14 may be molded or embedded within the exterior surface 22 of the inner sleeve 14. Alternatively, the heating member 14 may be attached to the exterior surface 22 of the inner sleeve 18 and subsequently covered with a thin flexible insulating material, or the heating member 14 may be first encapsulated in an insulating material and then adhered to the exterior surface 22 of the inner sleeve 18. As a non-limiting example, the heating member 14 comprises heating resistance wire or wires 24 which are coated or insulated with an insulating material, such as, enamel. The heating wire or wires 24 are solid, stranded or of a braided configuration. The heating member 14 is selected and designed to have the proper gauge, shape, length, type, thermal property and resistance so as to provide efficient, optimum heating.

The hand grip 12 further includes an outer sleeve 32 having an inner surface 34 and an outer surface 36. The outer sleeve 32 is made of a thermoplastic, synthetic, foam, rubber, plastic or leather material or any combination thereof. The outer sleeve 32 includes a gripping member 38 and an end section 40. The outer sleeve 32 may be molded as one integral part including the gripping member 38 and the end section 40 or may be fabricated in two sections, a first section defining a gripping member 38 and a second section defining the end section 40 wherein the first and second section are then affixed together to form the outer sleeve 32. In non-limiting examples, the gripping member 38 comprises a resilient elastomer, thermoplastic, plastic, synthetic rubber or rubber material that resists abrasion and provides a durable, cushioned grip. The gripping member 38 is textured or patterned with a plurality of dimples 44 or ridges 46 in order to enhance the gripping properties of the electrically heated hand grip 10. The dimples 44 and ridges 46 reduce slippage of a golfer's hands on the gripping member 38 in adverse conditions by increasing the frictional contact of the golfer's hands relative to the grip. The gripping member 38 may comprise any shape, however, the interior surface 34 of the gripping member 38 must correspond to the shape of the inner sleeve 18 in order to afford a proper fitting. The end section 40 includes a plurality of threads 42 externally formed thereon. The end section 40 may comprise a rigid, durable, plastic or hard rubber material adapted to withstand wear and tear.

The outer sleeve 32 is inserted over the heating member 14 and the Inner sleeve 18. The outer sleeve 32 receives the first electrical terminal 26 and the second electrical terminal 28 so that terminals 26 and 28 pass longitudinally through the center of the outer sleeve 32 and extend outward from the end section 40 when the outer sleeve 32 is completely inserted over the inner sleeve 18 and heating member 14. The outer sleeve 32 is adapted to completely cover the heating member 14 and the exterior surface 22 of the inner sleeve 18 so as to form an integrated hand grip. The outer sleeve 32 is securely attached to the exterior surface 22 of the inner sleeve 18 by an adhesive material, such as, an epoxy, adhesive tape, glue, resin or a hot-melt adhesive.

Referring to FIG. 2a there is shown an electrically heated hand grip 110, in accordance with a second embodiment of the present invention. The electrically heated hand grip 110 includes a hand grip 48. The hand grip 48 includes an inner sleeve 50 having an interior surface 52 and an exterior surface 54 and a plurality of hollow ribs 56 and 56a. The plurality of hollow ribs 56 and 56a are helically disposed about the exterior surface 54 of the inner sleeve 50. The hollow ribs 56 and 56a can be all the same height, width and length or of differing heights, widths or lengths. The hollow ribs 56 and 56a are cylindrical, rectangular or square in shape and fabricated or formed from a plastic, foam or rubber material.

It will be appreciated that although the plurality of hollow ribs 56 and 56a are shown as being helically wrapped around the exterior surface 54 of the inner sleeve 50, the hollow ribs 56 and 56a may also extend along the longitudinal axis of the exterior surface 54 of the inner sleeve 50.

A heating member 14 is inserted within a first top end 58 of hollow rib 56 such that the heating member 14 passes through the center of hollow rib 56 and helically wraps around the exterior surface 54 of inner sleeve 50 and extend outward from a first bottom end 60 of hollow rib 56. A part of the heating member 14 extends outward from the first top end 58 of hollow rib 56 in order to provide a first electrical terminal 26. The heating member 14 is reinserted in a second bottom end 64 of hollow rib 56a. The heating member 14 passes through the center of hollow rib 56a and helically wraps around the exterior surface 54 of the inner sleeve 50 and extend outward from a second top end 62 of hollow rib 56a. A part of the heating member 14 extends outward from the second top end 62 of hollow rib 56a in order to provide a second electrical terminal 28. The heating member 14 comprises electrical resistance heating wire 24 which is bare without any insulation, however, the electrical resistance heating wire 24 can be insulated with an insulating material such as an enamel before being inserted within the hollow ribs 56 and 56a. The heating wire 24 is solid, stranded or braided. The heating wire 24 is selected or custom designed to have the proper gauge, shape, length, type, thermal property and resistance so as to provide efficient, optimum heating.

Referring to FIG. 2b, the hand grip 48 further includes an outer sleeve 66 having an interior surface 70 and an outer surface 72. The outer sleeve 66 includes a plurality of spaced channels 68 which are helically formed within the interior surface 70 of the outer sleeve 66 such that the plurality of spaced channels 68 are positioned in corresponding relation to the plurality of hollow ribs 56 and 56a as described above in reference to FIG. 2a. The outer sleeve 66 is made of a thermoplastic, synthetic, foam, rubber, or plastic material or any combination thereof. The outer sleeve 66 includes a gripping member 71 and an end section 73. The outer sleeve 66 may be molded as one integral part including the gripping member 71 and an end section 73. In non-limiting examples, the gripping member 71 comprises a resilient elastomer, thermoplastic, plastic, synthetic rubber or rubber material that resists abrasion and provides a cushioned grip. The gripping member 71 is textured or patterned with a plurality of dimples 44 or ridges 46 in order to enhance the gripping properties of the hand grip 48. As noted earlier, the dimples 44 and ridges 46 reduce slippage of a golfer's hands on the gripping member 71 in adverse conditions by increasing the frictional contact of the golfer's hands relative to the grip. The end section 73 includes a plurality of threads 74 externally formed thereon. The end section 73 may comprise a rigid, durable, plastic or hard rubber material adapted to withstand wear and tear.

It will be appreciated that the end section 73 can be fabricated to have no threads. In addition, an end cap assembly 16 (as described below) can also be fabricated to have no threads. The end section 73 receives a corresponding end cap assembly 16 which is affixed to the end section 73 with an epoxy, adhesive material or mechanical fastener, such as, staples, screws, or a clamp. The gripping member 71, the end section 73 and the end cap assembly 16 can be fabricated in a variety of shapes or sizes.

The outer sleeve 66 is inserted over the plurality of hollow ribs 56 and 56a and the inner sleeve 50. The outer sleeve 66 receives the first electrical terminal 26 and the second electrical terminal 28 so that the terminals 26, 28 pass longitudinally through the center of the outer sleeve 66 and extend outward from the end section 73 when the outer sleeve 66 is completely inserted over the inner sleeve 50. The outer sleeve 66 is adapted to completely cover the plurality of hollow ribs 56 and 56a and the inner sleeve 50 so as to form an integrated hand grip. The outer sleeve 66 is securely attached to the exterior surface 54 of the inner sleeve 50 by an adhesive material, such as, an epoxy, adhesive tape, glue, resin or a hot-melt adhesive.

Figures 3A, 3B:
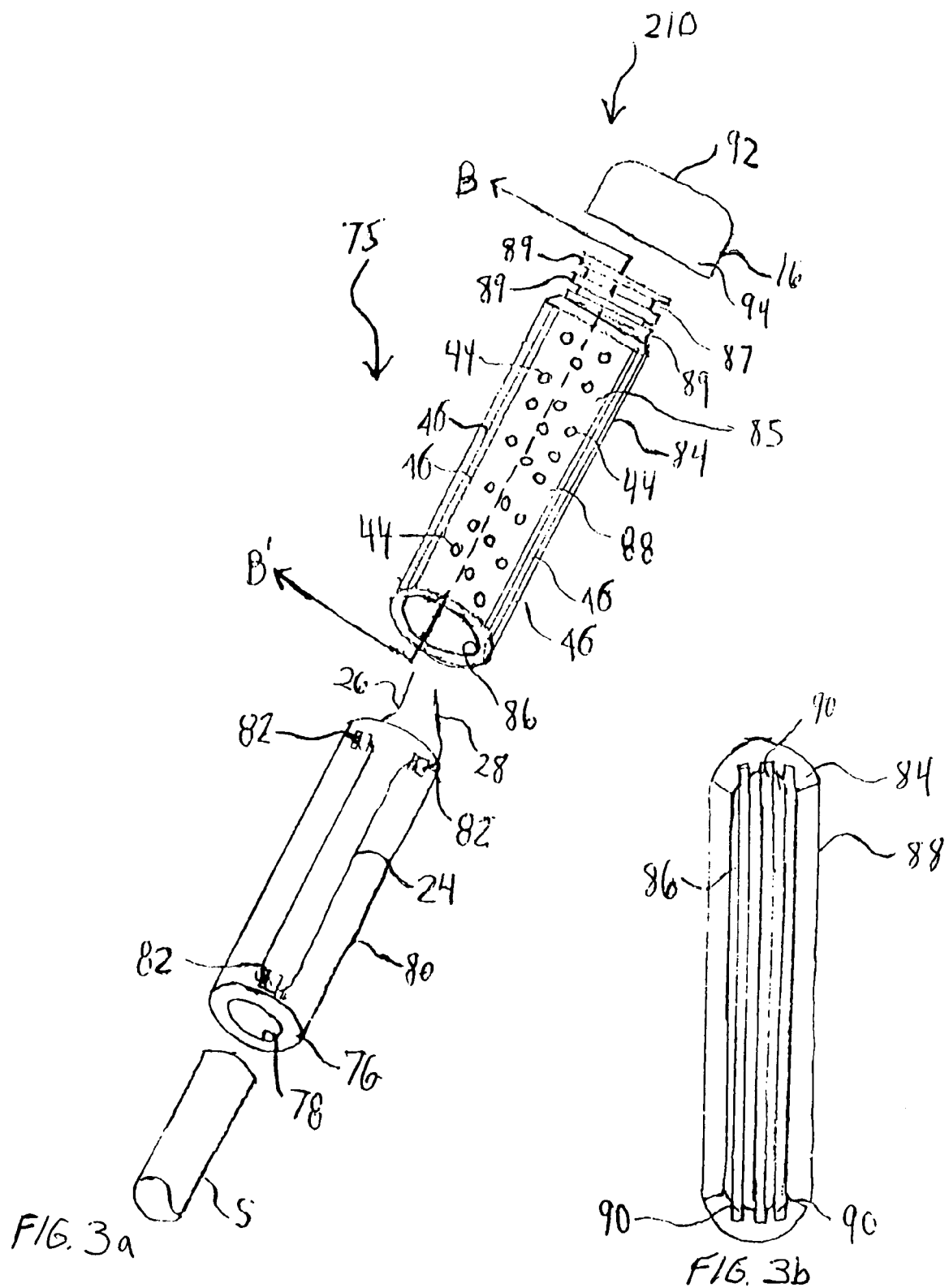
FIG. 3a is an exploded view, taken in perspective of the electrically heated hand grip adapted to be mounted on the end of a shaft. The electrically heated hand grip includes a hand grip which includes an inner sleeve having a plurality of stubs surroundingly disposed about the exterior surface of the inner sleeve, wherein each stub includes a hole for receiving an electrical heating resistance wire in accordance with a third embodiment of the present invention.
FIG. 3b is a cross sectional view of an outer sleeve taken along the line B–B' of FIG. 3a showing a plurality of channels longitudinally formed within the interior surface of the outer sleeve for receiving and correspondingly mating with the plurality of stubs.
Figure 4:
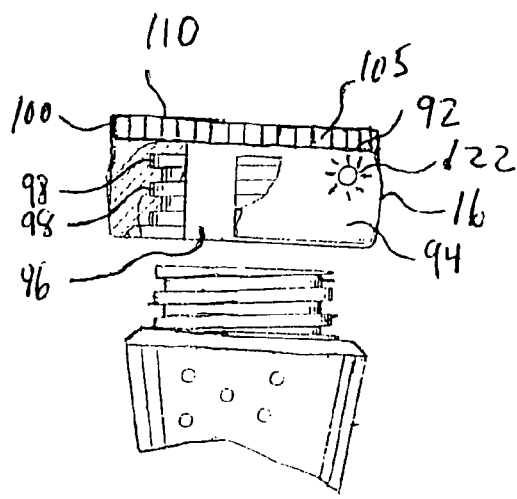
FIG. 4 is a partially sectioned front view illustrating an end cap assembly including internal threads, a receptacle, a light-emitting diode and a variable resistance on/off switch, wherein the end cap assembly is removably threaded to the end section of an outer sleeve.

Referring now to FIGS. 3a and 3b, there is shown an electrically heated hand grip 210 in accordance with a third embodiment of the present invention. The electrically heated hand grip 210 includes a hand grip 75. The hand grip 75 includes an inner sleeve 76 having an interior surface 78, an exterior surface 80 and a plurality of stubs 82. The plurality of stubs 82 are disposed about the exterior surface 80 of the inner sleeve 76. The plurality of stubs 82 may be all the same height, width or length and may be cylindrical, square or rectangular, in shape. The plurality of stubs 82 are fabricated from a plastic, rubber or foam material. In addition, each of the plurality of stubs 82 includes a hole for receiving a heating member 14, such as, electrical resistance heating wire 24.

The electrical resistance heating wire 24 is inserted into each hole of each stub 82 and is longitudinally disposed about the exterior surface 80 of the inner sleeve 76 such that the electrical resistance heating wire 24 surrounds the exterior surface 80 of inner sleeve 76. A part of the electrical resistance heating wire 24 extends outward from a top end of the inner sleeve 76 in order to provide a first electrical terminal 26. A second end of the electrical resistance heating wire 24 also extends outward from the top end of the inner sleeve 76 in order to provide a second electrical terminal 28. The heating wire 24 can be bare without any insulation or can be insulated with an insulating material, such as, an enamel before being inserted within each hole of each stub 82. The heating wire 24 may be solid, stranded or braided. The heating wire 24 is selected or custom designed to have the proper gauge, shape, length, type, thermal property and resistance so as to provide efficient, optimum heating.

The hand grip 75 further includes an outer sleeve 84 having an interior surface 86 and an exterior surface 88. The outer sleeve 84 of the third embodiment differs from the preferred embodiment and the second embodiment only to the extent that the outer sleeve 84 includes a plurality of channels 90 which are longitudinally formed within the interior surface 86 of the outer sleeve 84 such that each of the plurality of channels 90 are positioned in corresponding relation to the plurality of stubs 82. The outer sleeve 84 is inserted over the inner sleeve 76 and receives electrical terminals 26 and 28 such that when the outer sleeve 84 is inserted over the inner sleeve 76 the plurality of channels 90 are in contacting relation with the plurality of stubs 82. The outer sleeve 84 is made of a thermoplastic, synthetic, foam, rubber, or plastic material or any combination thereof. The outer sleeve 84 includes a gripping member 85 and an end section 87. The outer sleeve 84 may be molded as one integral part including the gripping member 85 and an end section 87. In non-limiting examples, the gripping member 85 comprises a resilient elastomer, thermoplastic, plastic, synthetic rubber or rubber material that resists abrasion and provides a cushioned grip. The gripping member 85 is textured or patterned with a plurality of dimples 44 or ridges 46 in order to enhance the gripping properties of the hand grip 48. Again, the dimples 44 and ridges 46 reduce slippage of a golfer's hands on th gripping member 85 in adverse conditions by increasing the frictional contact of the golfer's hands relative to the grip. The end section 87 includes a plurality of threads 89 externally formed thereon. The end section 87 may comprise a rigid, durable, plastic or hard rubber material adapted to withstand wear and tear. The outer sleeve 84 is adapted to completely cover the plurality of stubs 82 and the inner sleeve 76 so as to form an integral hand grip. The outer sleeve 84 is securely attached to the exterior surface 80 of the inner sleeve 76 by an adhesive material, such as, an epoxy, adhesive tape, glue, resin or a hot-melt adhesive.

Referring to FIGS. 1a, 2a, 3a, and 4–8, there is shown an end cap assembly 16 as denoted above earlier. The end cap assembly 16 includes a top member 92 and a sidewall member 94 coupled to the top member 92. The physical coupling of the top member 92 and sidewall member 94 forms a receptacle 96.

The receptacle 96, is adapted to receive an electrical connecting means 120 and the power source 30. Since the electrical connecting means 120 and the power source 30 are disposed within the receptacle 96, this allows for a completely integrated hand grip. The height, circumference and diameter of the sidewall member 94 is designed and fabricated to form a receptacle 96 which provides enough space to include the power source 30 and the electrical connecting means 120, which will be described herein below.

The end cap assembly 16 further includes a plurality of threads 98 formed on the interior surface of the sidewall member 94 for threadably receiving the threaded end sections 40, 73 and 87 of outer sleeves 32, 66 and 84. As noted earlier, the end cap assembly 16 may include a sidewall member 94 which does not include a plurality of threads 98 formed thereon. This allows for an end cap assembly 16 to correspondingly attach to an end section which is not round or cylindrical in shape and where threadably inserting the end cap assembly is not possible. Preferably, the end cap assembly 16 is formed of a rigid, durable, plastic or rubber material.

The end cap assembly 16 also includes an electrical switch 100 which is disposed about either the top member 92 or sidewall member 94. The electrical switch 100 comprises any one of a variable resistance on/off switch, an on/off switch, an on/off timer or pulsing circuit, a timer switch, a thermostat switch, a potentiometer, a pushbutton, a dip switch, a toggle switch or a slideable switch. In a non-limiting example, the electrical switch 100 can be in the form of a potentiometer including a thumbwheel 110 for controllably activating the electrical switch 100. The potentiometer may be designed where only an outer ridge 105 of the thumbwheel 110 rotates or where both the thumbwheel 110 and outer ridge 105 may rotate. The diameter of the thumbwheel 110 is of the same diameter as the top member 92 of the end cap assembly 16 such that when the electrical switch 100 is disposed about the top member 92, the outer ridge 105 of the thumbwheel 110 is flush with the sidewall member 94. The electrical switch 100 can be disposed within or about any one of the top member 92, the sidewall member 94, outer sleeves 32, 66, or 84, and hand grips 12, 48, or 75.

The end cap assembly 16 can further include a light-emitting diode 122, of any desired color, for indicating when the heating member 14 is receiving power and thus, generating heat. Preferably, a low current light-emitting diode 122 is used so as not to draw much current and voltage from the power source 30.

Figure 5:
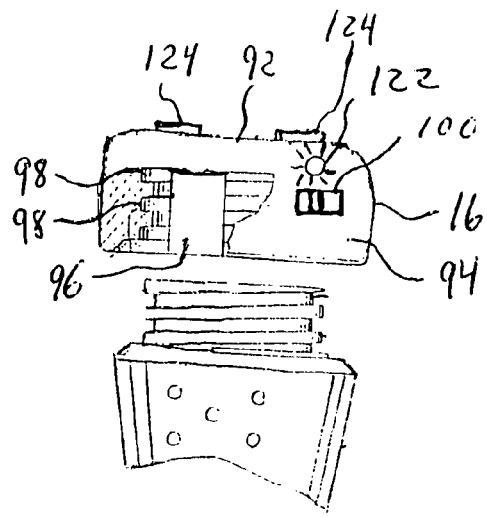
FIG. 5 is a partially sectioned front view illustrating an end cap assembly including internal threads, a receptacle, a light-emitting diode, a slideable on/off switch and a charging means, wherein the end cap assembly is threadably attached to the end section of an outer sleeve.

As shown in FIG. 5, the end cap assembly 16 may further include a charging means 124 for electrically charging the power source 30. The charging means 124 may comprise two charging posts or contacts disposed within the top member 92 of the end cap assembly 16 wherein an external voltage supply (not shown) may be electrically coupled to said two charging contacts in order to provide power to said power source 30 thereby charging the power source 30. The two charging contacts can be fabricated from metal, copper, iron, aluminum, nickel, silver, or gold. The charging means 124 can include at least one solar cell (not shown) which is electrically coupled to the power source 30 for converting light energy to electrical energy wherein said electrical energy is supplied to the power source 30 thereby charging the power source 30.

The power source 30 includes one or more conventional batteries or may include one or more custom, designed batteries, which is, or are capable of providing enough voltage and current to the heating member 14 in order to generate optimum heat. The power source 30 can comprise conventional rechargeable batteries or custom, designed rechargeable batteries which can easily be recharged from a power supply or the at least one solar cell. Preferably, the batteries are custom designed or conventional button or watch type batteries which fit within or are disposed within the receptacle 96. As noted above, the electrical switch 100 may comprise an on/off pulsing circuit which pulses current and voltage to the heating member 14 thereby limiting the amount of current flowing to the heating member 14.

Figure 6:
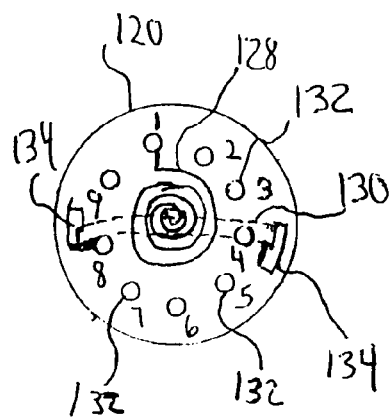
FIG. 6 is a bottom plan view of the electrical connecting means including a first polarity contact, a second polarity contact, at least on connecting member and the holding posts.

Referring to FIGS. 6 and 7, there is shown an electrical connecting means 120. The electrical connecting means 120 includes a first polarity contact 128, a second polarity contact 130, a plurality of connecting members 132 and holding posts 134 for electrically connecting the electrical switch 100, the heating member 14, the light-emitting diode 122 and the charging means 124 to the power source 30. The first polarity contact 128 is electrically connected to the negative polarity of the power source 30 and the second polarity contact 130 is electrically connected to the positive polarity of the power source 30, or vice versa. The first polarity contact 128 and the second polarity contact 130 are fabricated from a conductive material, such as, a metal spring, a metal or copper strip or plate, or a plastic piece having attached thereto a conductive material. The first polarity contact 128 is electrically coupled to one connecting member 132 and the second polarity contact 130 is electrically coupled to second connecting member 132. As noted earlier, the electrical connecting means 120 also includes a plurality of connecting members 132 for providing a central location where the power source 30, heating member 14, electrical switch 100, light-emitting diode 122, charging means 124, the first polarity contact 128 and the second polarity contact 130 are electrically connected. It will be appreciated that the electrical connecting means 120 may include alone or in combination any one of, metal inserts, spring connectors, electrical connectors, solder posts or joints, wire connectors, or a printed circuit board configuration.

The manner of electrically connecting the electrical switch 100, heating member 14, light-emitting diode 122, the charging means 124 and the power source 30 for controllably supplying current to the heating member 14 and generating heat will be described herein below in reference to FIG. 14.

Figure 8:
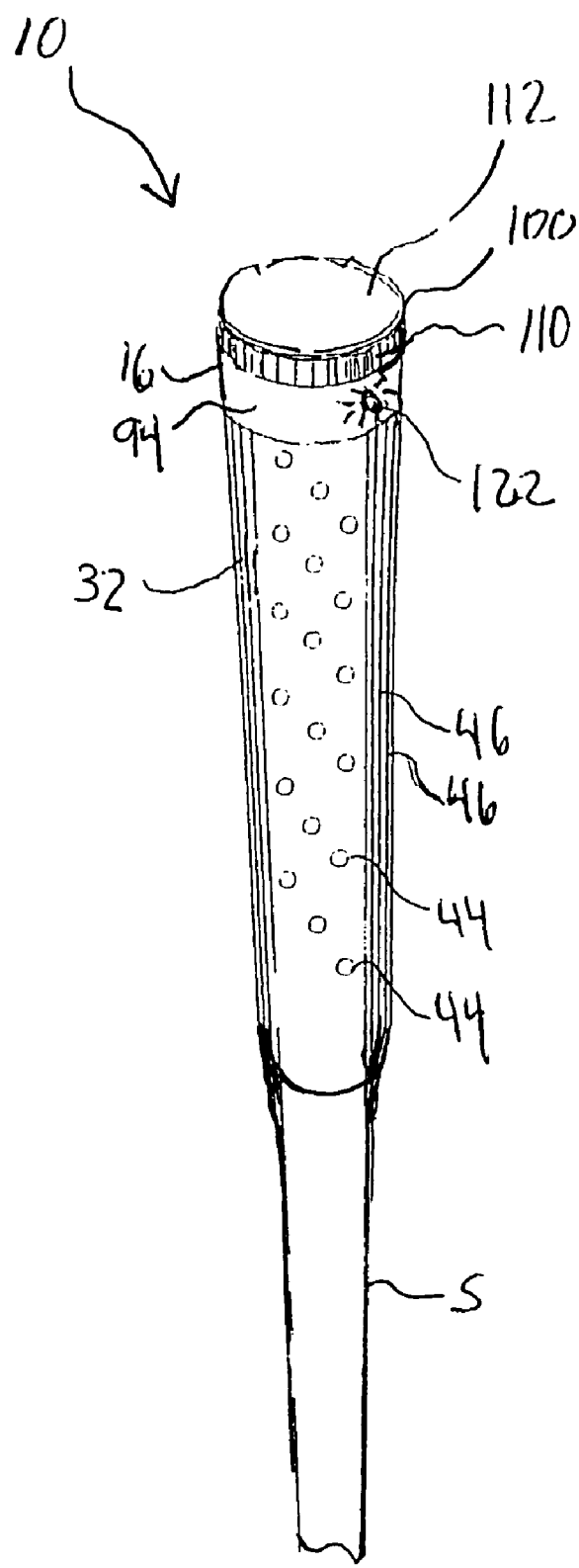
FIG. 8 is a perspective view showing an electrically heated hand grip mounted on to the end of a shaft of a golf club, the electrically heated hand grip including an end cap assembly threadably attached to the end section of an outer sleeve, said end cap assembly including a variable resistance on/off switch and a light-emitting diode.
Figure 9:
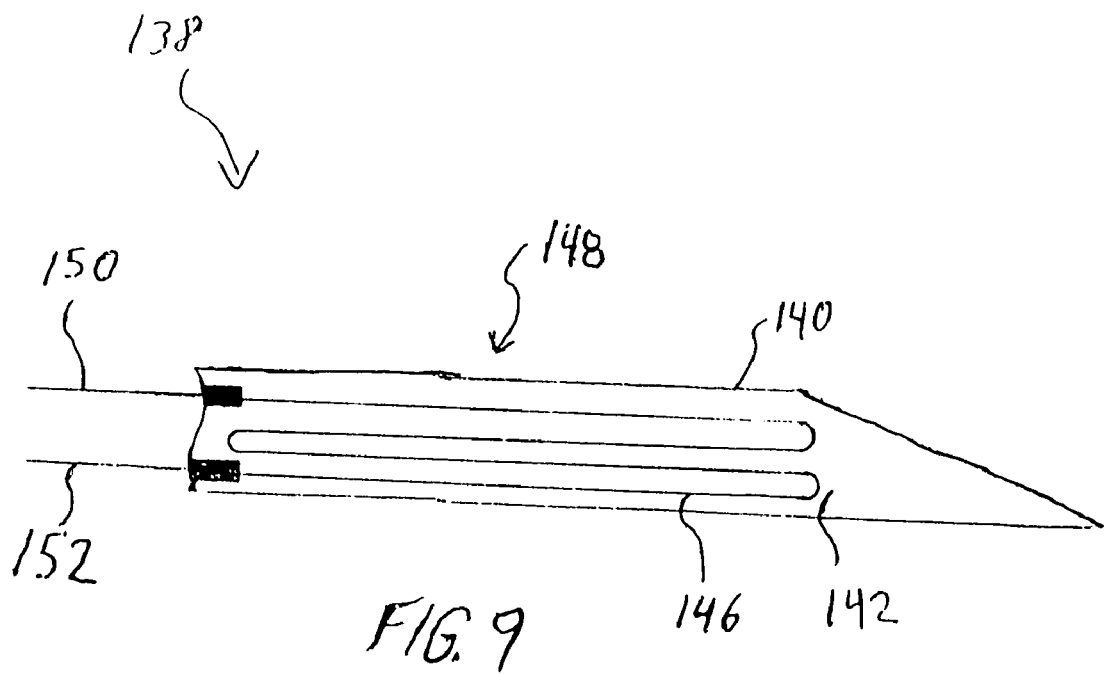
FIG. 9 is a plan view of a resilient strip having an interior surface, an outer surface and a heating member including a first electrical terminal and a second electrical terminal, said heating member being adhesively attached or molded within the interior surface of the resilient strip thereby forming a heating strip.

FIG. 8 illustrates an electrically heated hand grip 10 integrally mounted on to a shaft S of a golf club. It can be seen that in a preferred embodiment of the present invention, the end cap assembly 16 includes an electrical switch 100 comprising a variable resistance on/off potentiometer for controlling the supply current to the heating member 14. As described above, the end cap assembly 16 may also include a light-emitting diode 122 mounted within the sidewall member 94 for indicating when power is being supplied to the heating member 14. In addition, the electrically heated hand grip 10 includes a plurality of dimples 44 and ridges 46 formed on a gripping section for providing slip-inhibiting features and enhancing the gripping properties of the golf club.

Referring now to FIGS. 9–13, wherein like elements are represented by the same reference numbers throughout, there is shown an electrically heated hand grip 138 in accordance with a fourth embodiment of the present invention. The electrically heated hand grip 138 includes a resilient strip 140 having an inner surface 142 and an outer surface 144. The resilient strip 140 is formed from a highly durable leather, rubber, thermoplastic, thermoplastic elastomeric or synthetic material which includes vibration dampening characteristics. The resilient strip 140 includes a heating member 146 which is embedded within or attached to the inner surface 142 of the resilient strip 140 so as to form a heating strip 148.

The heating member 146 comprises any one of an electrical resistance heating wire, etched-foil, a flexible printed circuit heater or a flexible carbon fiber heater for generating heat, all of which are well known in the art and do not require further explanation herein. Preferably the heating member 146 is encased in a thin sheet of flexible insulating material, such as, silicone rubber or an enamel and then adhesively attached to the inner surface 142 of the resilient strip 140. Alternatively, the heating member 146 may be molded within the inner surface 142 of the resilient strip 140. The heating member 146 may comprise a heating resistance wire or wires which are coated or insulated with an insulating material, such as, enamel. The heating wire or wires may be solid, stranded or of a braided configuration and may comprise various gauges of suitable diameter, length and resistance so as to provide optimum heating. The resilient strip 140 further includes electrical conductors 150, 152 which are connected to the heating member 146 for electrically connecting the heating member 146 to a power source 30, via, an electrical switch 100, as described above earlier.

Figure 10:
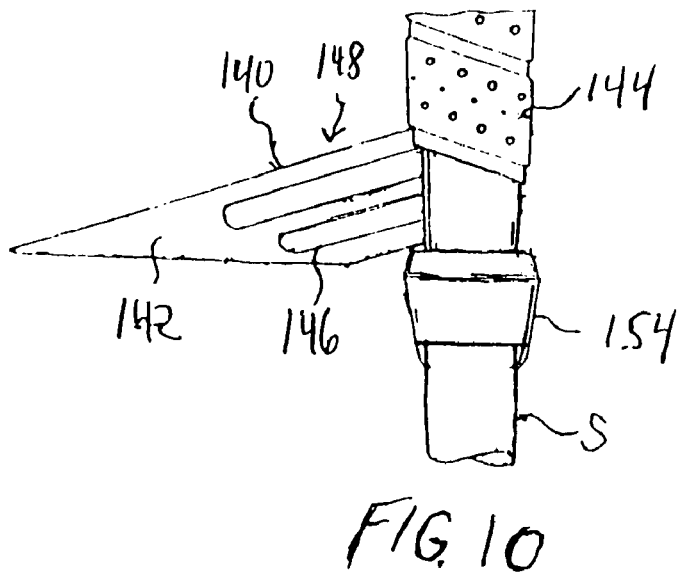
FIG. 10 is a broken front elevation view of an electrically heated hand grip including a heating strip spirally wrapped around a shaft, where a lower portion of the heating strip is secured to the shaft with an adhesive or mechanical fastener, such as, a ferrule.

As illustrated in FIG. 10, the heating strip 148 is spirally wrapped about the exterior surface of a shaft S so as to completely surround and cover a grip-receiving portion of the shaft S. The heating strip 148 is secured to the exterior surface of the shaft S using an epoxy adhesive, hot melt adhesive, glue, resin or adhesive tape. A lower end of the heating strip 148 is adapted to be securely attached to the lower portion of the shaft S with a mechanical fastener, such as, a ferrule 154.

There is shown in FIG. 11, an end cap assembly 156 including a top member 158 and a sidewall member 160. The top member 158 and sidewall member 160 are coupled together so as to form a receptacle 162. The end cap assembly 156 further includes a butt end 164. The butt end 164 has a larger diameter then the end diameter of the shaft S so that when the end cap assembly 156 is inserted on the end of the shaft S, the butt end 164 slides over the end of the shaft S and secures a portion of the heating strip 148. The butt end 164 may also include a diameter that is smaller then the end of the shaft S so that when the end cap assembly 156 is inserted in the end of the shaft S, via, the hole in the end of the shaft and secures one end of the heating strip 148. The end cap assembly 156 may comprise any geometrical shape and size so as to accommodate the shape and size of a corresponding shaft S.

As shown in FIG. 12, the electrically heated hand grip 138 may further include a sleeve 166 having an interior surface (not shown), and an exterior surface 168. The sleeve 166 is a poor conductor of heat and is designed to reflect heat there by preventing heat from reaching or dissipating to the shaft S. The sleeve 166 is fabricated from a ceramic, rubber, plastic, thermoplastic, foam or synthetic material which includes thermal resistant properties. The sleeve 166 is secured to a grip-receiving portion of the shaft S with an epoxy adhesive, hot melt adhesive, glue, resin or adhesive tape. The grip-receiving portion of the shaft is defined as the area where a person positions his or her hands to hold the apparatus securely.

After the sleeve 166 is inserted on the grip receiving portion of the shaft S, the heating strip 148 is spirally wrapped around the exterior surface 168 of the sleeve 166 so as to completely surround the grip-receiving portion of the sleeve 166. The bottom end of the heating strip 148 is secured to the sleeve 166 and shaft S using an epoxy or adhesive material or a mechanical fastener, such as, a ferrule 154, as shown in FIG. 10. The top end of the heating strip 148 is secured to the top end of the shaft S with an end cap assembly 156 as described above in reference to FIG. 11. The end cap assembly 156 is removably attached to the end of the sleeve 166. It will be appreciated that the end cap assembly 156 may or may not include an electrical switch 100 and light-emitting diode 122 as described in reference to FIGS. 4 and 5 above. As illustrated in FIG. 12, a miniature electrical switch 100 is disposed about the outer surface 144 of the heating strip 148. The outer surface 144 of the heating strip 148 includes a plurality of dimples or perforations 170 to provide slip-inhibiting properties.

FIG. 13 illustrates an electrically heated hand grip 138 integrally mounted on the end of a shaft S of a ski pole. A sleeve 172, which is designed to fit within the hand of a skier when the skier holds the ski pole, is mounted or inserted on the shaft S of the ski pole. The heating strip 148 is spirally wrapped about the exterior surface of the sleeve 172. A lower end of the heating strip 148 may be secured to the sleeve 172 using epoxy, adhesive, hot-melt adhesive, tape, cement glue, resin or a mechanical fastener. The electrically heated hand grip 138 includes an end cap assembly 156 which is inserted on to the end of the shaft S. The butt end 164 of the end cap assembly 156 slides over the end of the shaft S and secures one end of the heating strip 148. The end cap assembly 156 may be secured to the sleeve 172 and shaft S using an epoxy, adhesive, hot-melt adhesive, tape, cement glue, resin, or mechanical fastener. The end cap assembly 156 may also include an electrical switch 100. The outer surface 144 of the heating strip 140 includes a plurality of dimples or perforations 170 to provide slip-inhibiting properties.

Figure 14:
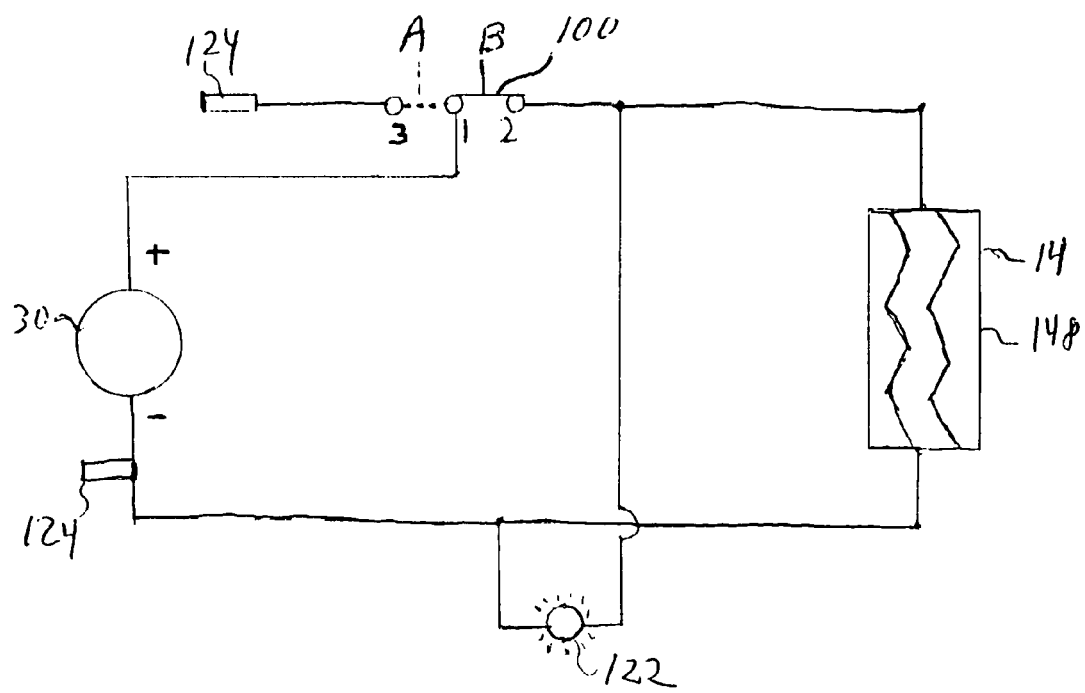
FIG. 14 is a schematic diagram showing the electrical connection of an electrical switch, a heating member or heating strip, a light-emitting diode, a charging means and a power source.

FIG. 14 illustrates a schematic diagram showing the electrical configuration of an electrically heated hand grip. A positive polarity of the power source 30 is connected to a first pole of the electrical switch 100. The electrical switch 100 may include a two position, three-pole switch. A second pole of the electrical switch 100 is connected to a first electrical terminal 26 of the heating member 14 or a first electrical conductor 150 of the heating strip 148. The second electrical terminal 28 of the heating member 14 or the second electrical conductor 152 of the heating strip 148 is connected to a negative polarity of the power source 30. A light-emitting diode 122 is connected to a first electrical terminal 26 of the heating member 14 or a first electrical conductor 150 of the heating strip 148 and to a second electrical terminal 28 of the heating member 14 or the second electrical conductor 152 of the heating strip 148. A charging means 124 is connected to a positive polarity of the power source 30 via, a third pole of the electrical switch 100 and to a negative polarity of the power source 30.

In operation, when the electrical switch 100 is in position B, the power source 30 is electrically coupled to the heating member 14 or heating strip 148 and to the light-emitting diode 122. When the electrical switch 100 is in position A, the power source 30 is electrically decoupled or unconnected to the heating member 14 or heating strip 148 and the light-emitting diode 122 and coupled to the charging means 124, thus, when the electrical switch 100 is in position A, the charging means 124 charges the power source 30 without interfering with the circuit. When the electrical switch 100 is in position B, the charging means 124 has no affect on the circuit even if it was applied to the power source 30. It will be appreciated that although the circuit shown includes a two position, three pole electrical switch 100, other electrical switches can be used. Although the schematic shows an electrical switch 100 disconnecting the heating member 14 or heating strip 148 and the light-emitting diode 122 to the power source 30 when the charging means 124 is applied to the power source 30, electrical switching may be configured to allow the charging means 124 to be applied to the power source 30 when the power source 30 is connected to the heating member 14 or heating strip 148 and the light-emitting diode 122.

Although the invention has been described above in relation to preferred embodiments thereof, it will be understood by those skilled in the art that variations and modifications can be effected in these preferred embodiments and in any alternate embodiments without departing from the scope and spirit of the invention.

What is claimed is:

1. A golf club including an electrically heated hand grip comprising:
   a hand grip inserted over an end of a shaft of said golf club;
   a heating member affixed within said hand grip;
   an end cap assembly including a receptacle having an electrical connecting means and a power source disposed therein, said end cap assembly being removably attached to said hand grip; and
   an electrical switch being electrically coupled to said power source, said electrical connecting means and said heating member for controlling a supply of current to said heating member, said electrical switch being disposed on said end cap assembly.

2. The electrically heated hand grip of claim 1 wherein said hand grip further comprises an inner sleeve having an interior surface and an exterior surface, said inner sleeve including heat reflective properties and being inserted over the end of the shaft of said golf club.

3. The electrically heated hand grip of claim 2 wherein said heating member includes a first electrical terminal and a second electrical terminal, said heating member being adhered to the exterior surface of said inner sleeve.

4. The electrically heated hand grip of claim 3 wherein said hand grip further comprises an outer sleeve including a gripping section and an end section, said outer sleeve being inserted over said heating member and said inner sleeve so as to receive said first electrical terminal and said second electrical terminal such that said terminals pass longitudinally through said outer sleeve and extend outward from said end section.

5. The electrically heated hand grip of claim 4 wherein said outer sleeve is adhesively bonded to said heating member and said inner sleeve such that the outer sleeve completely encapsulates the heating member and the exterior surface of said inner sleeve forming an integral grip.

6. The electrically heated hand grip of claim 5 wherein said heating member comprises any one of electrical heating resistance wire, etched-foil heater, a flexible printed circuit heater and a flexible carbon fiber heater.

7. The electrically heated hand grip of claim 6 wherein said end section includes a plurality of threads externally formed thereon.

8. The electrically heated hand grip of claim 7 wherein said end cap assembly further includes a top member, a sidewall member coupled to said top member so as to form said receptacle, and a plurality of threads internally formed within said sidewall member for threadably receiving said end section.

9. The electrically heated hand grip of claim 8 wherein said electrical connecting means includes a first polarity contact, a second polarity contact, and at least one connecting member.

10. The electrically heated hand grip of claim 9 wherein said electrical switch comprises any one of a variable resistance on-off switch, an on-off switch, an on-off timer or pulsing circuit, a timer switch, a thermostat switch, a potentiometer, a toggle switch, a dip switch, a pushbutton and a slideable switch.

11. The electrically heated hand grip of claim 10 wherein said end cap assembly further includes a light-emitting diode electrically coupled to said electrical switch and said power source for indicating when said heating member is activated.

12. The electrically heated hand grip of claim 11 wherein said end cap assembly further includes a charging means electrically coupled to said power source for charging said power source.

13. The electrically heated hand grip of claim 1 wherein said hand grip further comprises an inner sleeve including an interior surface, an exterior surface, and a plurality of hollow ribs helically disposed about said exterior surface, said inner sleeve adapted to be inserted on to the end of said shaft.

14. The electrically heated hand grip of claim 13 wherein said heating member includes a first electrical terminal and a second electrical terminal, said heating member being inserted within each of said plurality of hollow ribs and helically wrapped around the exterior surface of said inner sleeve.

15. The electrically heated hand grip of claim 14 wherein said hand grip further comprises an outer sleeve including a gripping section, an end section, and a plurality of spaced channels helically formed within an interior surface of said outer sleeve such that the spaced channels are positioned in corresponding relation to said plurality of hollow ribs.

16. The electrically heated hand grip of claim 15 wherein said outer sleeve is inserted over said heating member and said inner sleeve so as to receive said first electrical terminal and said second electrical terminal such that said terminals pass longitudinally through said outer sleeve and extend outward from said end section, said outer sleeve being adhesively bonded to said inner sleeve such that said plurality of spaced channels are in bonding relation with said plurality of hollow ribs.

17. The electrically heated hand grip of claim 16 wherein said heating member comprises electrical heating resistance wire.

18. The electrically heated hand grip of claim 1 wherein said hand grip further comprises an inner sleeve including an interior surface, an exterior surface, and a plurality of hollow stubs disposed about said exterior surface, said inner sleeve adapted to be inserted on the end of said shaft.

19. The electrically heated hand grip of claim 18 wherein said heating member includes a first electrical terminal and a second electrical terminal, said heating member passing through each of said plurality of hollow stubs so as to be longitudinally disposed about the exterior surface of said inner sleeve.

20. The electrically heated hand grip of claim 19 wherein said hand grip further comprises an outer sleeve including a gripping section, an end section, and a plurality of channels longitudinally formed within an interior surface of said outer sleeve such that the plurality of channels are positioned in corresponding relation to said plurality of hollow stubs.

21. The electrically heated hand grip of claim 20 wherein said outer sleeve is inserted over said heating member and said inner sleeve so as to receive said first electrical terminal and said second electrical terminal such that said terminals pass longitudinally through said outer sleeve and extend outward from said end section, said outer sleeve being adhesively bonded to said inner sleeve such that said plurality of channels are in bonding relation with said plurality of hollow stubs.

22. The electrically heated hand grip of claim 21 wherein said heating member comprises electrical heating resistance wire.

23. A golf club including an electrically heated hand grip adapted to be mounted on to a shaft of said golf club, said electrically heated hand grip comprising:
- a hollow inner sleeve having an interior surface and an exterior surface, said hollow sleeve being inserted on to a grip-receiving portion of said shaft;
- a heating member including a first electrical terminal and a second electrical terminal, said heating member being molded within or adhesively attached to the exterior surface of said hollow inner sleeve;
- an outer sleeve including a gripping section and a threaded end section, said outer sleeve being inserted over said heating member and said inner sleeve so as to receive said first electrical terminal and said second electrical terminal such that said terminals pass longitudinally through said outer sleeve so as to extend outward from said threaded end section, wherein said outer sleeve is adhesively secured to said hollow inner sleeve;
- an end cap assembly including a receptacle having an electrical connecting means and a power source disposed therein, said end cap assembly threadably receiving said end section; and
- an electrical switch disposed on said end cap assembly, said electrical switch being electrically coupled to said heating member and said power source for controlling the supply of current to said heating member.

24. The electrically heated hand grip of claim 23, wherein said heating member comprises any one of electrical heating resistance wire, etched-foil heater, a flexible printed circuit heater and a flexible carbon fiber heater.

25. The electrically heated hand grip of claim 24, wherein said electrical switch comprises any one of a variable resistance on-off switch, an on-off switch, an on-off timer or pulsing circuit, a timer switch, a thermostat switch, a potentiometer, a toggle switch, a dip switch, a pushbutton and a slideable switch.

26. An electrically heated hand grip comprising:
- a resilient strip including an inner surface and an outer surface;
- a heating member molded within or adhesively attached to the inner surface of said resilient strip so as to form a heating strip, said heating strip being spirally wrapped about a shaft of a golf club; and
- an end cap assembly removably coupled to said shaft for securing a portion of said heating strip, said end cap assembly including a top member and a sidewall member coupled to said top member so as to form a receptacle, said receptacle having a power source and an electrical connecting means disposed therein; and
- an electrical switch being electrically coupled to said power source, said electrical connecting means and said heating member for controlling a supply of current to said heating member, said electrical switch being disposed on said end cap assembly.

27. The electrically heated hand grip of claim 26 wherein said heating member comprises any one of electrical heating resistance wire, etched-foil heater, a flexible printed circuit heater and a flexible carbon fiber heater.

28. The electrically heated hand grip of claim 27 wherein said electrical switch includes any one of a variable resistance on-off switch, an on-off switch, an on-off timer or pulsing circuit, a timer, a thermostat switch, a potentiometer, a toggle switch, a dipswitch, a pushbutton and a slideable switch.

29. The electrically heated hand grip of claim 28 wherein said end cap assembly further includes a light-emitting diode electrically coupled to said electrical switch and said power source for indicating when said heating member is being activated.

30. The electrically heated hand grip of claim 29 wherein said end cap assembly further includes a charging means electrically coupled to said power source for charging said power source.

31. The electrically heated hand grip of claim 30 wherein said electrically heated hand grip further comprises a sleeve having an interior surface and an exterior surface, said sleeve including heat reflective properties.

32. The electrically heated hand grip of claim 31 wherein said heating strip is spirally wrapped around the exterior surface of said sleeve such that a lower portion of said heating strip is secured to said sleeve and said shaft with an adhesive material or mechanical fastener.

* * * * *